(12) United States Patent
Ramanna et al.

(10) Patent No.: US 12,039,285 B2
(45) Date of Patent: Jul. 16, 2024

(54) MULTILINGUAL NATURAL LANGUAGE UNDERSTANDING (NLU) MODEL PLATFORM FOR UPDATING A SOFTWARE'S UNDERSTANDING ABILITY IN ONE LANGUAGE BASED ON NLU CHANGES IN ANOTHER LANGUAGE

(71) Applicant: ServiceNow, Inc., Santa Clara, CA (US)

(72) Inventors: Shiva Shankar Ramanna, Fremont, CA (US); Mimi Yu, Los Angeles, CA (US); Anantha Sai Ram, Tirupati (IN); Akanksha Aggarwal, Gurugram (IN); Erin Yu, Los Altos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 143 days.

(21) Appl. No.: 17/379,772

(22) Filed: Jul. 19, 2021

(65) Prior Publication Data
US 2023/0016962 A1    Jan. 19, 2023

(51) Int. Cl.
*G06F 40/47* (2020.01)
*G06F 16/2452* (2019.01)
*G06N 3/08* (2023.01)
*G06N 20/20* (2019.01)

(52) U.S. Cl.
CPC ............ *G06F 40/47* (2020.01); *G06N 20/20* (2019.01); *G06F 16/24522* (2019.01); *G06N 3/08* (2013.01)

(58) Field of Classification Search
CPC .... G06F 40/47; G06F 16/24522; G06F 40/58; G06N 3/08

USPC .................................................. 704/E15.019
See application file for complete search history.

(56) References Cited

U.S. PATENT DOCUMENTS

| | | | |
|---|---|---|---|
| 2007/0136068 A1* | 6/2007 | Horvitz .................... | G06F 40/58 |
| | | | 704/E15.019 |
| 2019/0354593 A1* | 11/2019 | Rojas ....................... | G06F 40/47 |
| 2019/0384822 A1* | 12/2019 | Tu ............................ | G06N 3/08 |
| 2022/0358125 A1* | 11/2022 | Scholak ............ | G06F 16/24522 |

OTHER PUBLICATIONS

Speeh-To-Speech Translation Between Unstranscribed Unknown Languages (Anros Tjiandra et a., 2019).*

* cited by examiner

*Primary Examiner* — Farzad Kazeminezhad
(74) *Attorney, Agent, or Firm* — Van Pelt, Yi & James LLP

(57) ABSTRACT

A specification of a first natural language understanding (NLU) machine learning model for a first human communication language is received. The specification specifies a language content associated with one or more intents of the first NLU machine learning model in the first human communication language. An identification of an association between the first NLU machine learning model and a second NLU machine learning model for a second human communication language is received. The first NLU machine learning model and the second NLU machine learning model are managed together. This includes detecting a change to the first NLU machine learning model in the first human communication language and a software using the first NLU and in response automatically assisting in maintaining consistency in the second NLU machine learning model in the second human communication language by respectively updating the software with respect to the detected change.

20 Claims, 8 Drawing Sheets

700 —

⌂Models > ▦ | To train, test, or publish this model, review intents and vocabulary, then mark each reviewed.

701 — ▦ ITSM | French - fr ▾ | • Needs review |

⊕ Add editor

703 — [ Train ] [ Test ]

705 — • Intents (3)  Entities (13)  • Vocabulary (20)  Settings

Review any translated utterances in each intent, then mark intent reviewed.

| Status | Name | Utterances | Associated entities | Mapped objects | Created Date | Last updated | Enable in language |
|---|---|---|---|---|---|---|---|
| 711 — • Needs review | Covid perks | 5 | 3 | Virtual Agent | 2020-12-13 23:34:52 | 2020-12-13 23:34:52 | ▨ |
| 713 — • Needs review | Hardware request | 3 | 3 | Virtual Agent | 2020-12-13 23:34:52 | 2020-12-13 23:34:52 | ▨ |
| 715 — • Needs review | Account access | 3 | 3 | Virtual Agent | 2020-12-13 23:34:52 | 2020-12-13 23:34:52 | ▨ |

801 — ITSM-French > Covid perks

803 — Covid perks  French - fr ∨   ● Needs review   0 of 3 intents reviewed  Mark reviewed Utterances (5)   Associated entities (0)   Settings Once you've reviewed the translated utterances and entities in this intent, mark it as reviewed.

[ Add ]

Show utterances ∨

811 — " quels sont mes avantages covid
    en What are my covid perks

813 — " Rembourser les avantages à Espresa
    en Reimburse perks in Espresa

815 — " Allocation Covid 2020
    en 2020 covid allowance

817 — " équipement ergonomique
    en ergonomic equipment

819 — " travail à domicile
    en work from home setup

FIG. 8

MULTILINGUAL NATURAL LANGUAGE UNDERSTANDING (NLU) MODEL PLATFORM FOR UPDATING A SOFTWARE'S UNDERSTANDING ABILITY IN ONE LANGUAGE BASED ON NLU CHANGES IN ANOTHER LANGUAGE

BACKGROUND OF THE INVENTION

Natural Language Understanding (NLU) models can be used in software applications and services to help interpret and understand the intention of users. For example, a virtual agent platform can utilize an NLU model to understand user statements. The NLU model can help determine what a user would like to do and to extract relevant values from the user's input. In the context of a virtual agent, an NLU model can also be used to map the user's statements to topics and corresponding tasks that the user would like to perform. By incorporating NLU models into software applications and services, the end result for the user is a more natural and engaging conversational experience.

BRIEF DESCRIPTION OF THE DRAWINGS

Various embodiments of the invention are disclosed in the following detailed description and the accompanying drawings.

FIG. 7 is a diagram illustrating an embodiment of a user interface for reviewing potential updates to a secondary Natural Language Understanding (NLU) model.

FIG. 8 is a diagram illustrating an embodiment of a user interface for reviewing user input statements for updating a secondary Natural Language Understanding (NLU) model.

DETAILED DESCRIPTION

Figure 1:
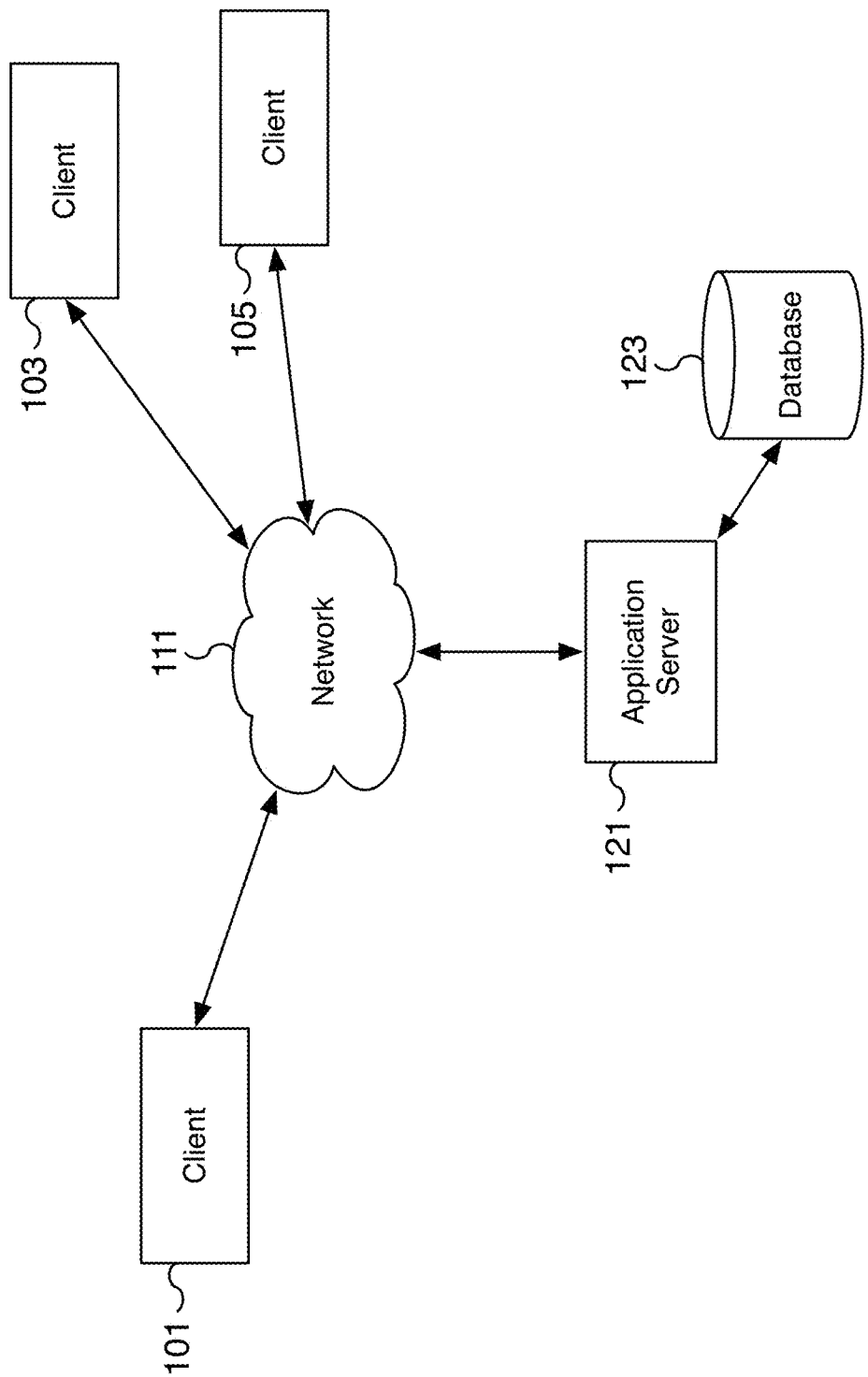
FIG. 1 is a block diagram illustrating an example of a network environment for a multilingual Natural Language Understanding (NLU) model platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multilingual Natural Language Understanding (NLU) model platform is disclosed. Using the disclosed platform and related techniques, NLU models to support different languages can be created and managed. For example, a primary NLU model is created in a first human language such as English. Secondary NLU models that are consistent with the first NLU model are then created to support additional languages. Moreover, any future updates to the primary NLU model trigger automated updates to the secondary NLU models. For example, a new topic or intent added to the primary NLU model can be easily identified and added to each secondary NLU model along with automatic language translations for the relevant and required content of the new topic/intent. In this manner, the disclosed multilingual NLU model platform allows the functionality and content of the different related NLU models to be kept consistent. Moreover, once a primary NLU model is configured for use by a software application, the targeted software application automatically integrates with the secondary NLU models to provide support and functionality for the additional languages of the secondary models. In various embodiments, the supported software applications include cloud-hosted application services such as a virtual agent or an artificial intelligence search service.

In some embodiments, a primary NLU model is configured to understand user input statements such as user input utterances. The configured user input statements are then mapped to intents (or topics) and entities, such as objects or values for the intent. In some embodiments, vocabulary can be configured to allow support for synonyms and/or custom definitions for words based on context. Once configured and trained, the primary NLU model is able to infer context from a user statement. The disclosed multilingual NLU model platform allows an NLU model designer to automate the creation of multiple secondary NLU models that each maintains consistency with the primary NLU model. For example, using an NLU model builder tool allows a secondary NLU model to be created based on a selected primary NLU model. The core model framework of the primary model is used to initialize the secondary model. For example, intents and entities of the primary model are initialized for the secondary model and input statements are automatically translated to the configured language of the secondary model. In some embodiments, the intents correspond to a user topic expressed by a user input statement and the entities are configured as objects or values that are mapped to an identified word or phrase of an input statement.

In some embodiments, a reviewer is assigned to review the created secondary NLU model. The assignment of a newly created model for review can be routed to the assigned reviewer, for example, via a cloud-based web interface, for the reviewer to modify and refine the configuration of the secondary model. For example, the reviewer can review the automated translations and the mapping of entities for correctness. Any feedback from the reviewer is integrated into the secondary model. Once approved, the secondary model is trained to generate the secondary NLU machine learning model and corresponding machine learning weights.

In various embodiments, each trained secondary NLU model is automatically integrated into any application software application or service that the primary model is configured to work with. For example, a virtual agent that uses a primary NLU model to understand a first language is automatically expanded to support additional languages by automatically integrating additional trained secondary NLU models. In various embodiments, secondary models are created such that the NLU-based application is compatible and interoperable between primary and secondary models.

In some embodiments, changes to a primary NLU model are automatically migrated to secondary models. For example, changes to the intents, entities, vocabulary, etc. of a primary model are automatically identified and integrated into secondary models. The modifications are routed to a reviewer for approval. For example, a notification that the primary model has changed, and that the changes can be carried forward to one or more secondary models is automatically generated. In some embodiments, different reviewers can be assigned to different secondary models, for example, based on language expertise, and receive a corresponding notification for updates to their respective secondary models. Updates are created for each secondary NLU model based on the detected changes to the primary NLU model and the assigned reviewers for each secondary NLU model are granted permissions to modify and approve their respective updates. Once a reviewer has provided feedback and approved any changes to a secondary model, the secondary model is trained and can be published for associated applications to support the newly added model functionality.

In some embodiments, a specification of a first natural language understanding machine learning model for a first human communication language is received. For example, an operator such as an NLU model designer can configure an NLU machine learning model in a specific language such as a designated primary language. In some embodiments, the specification specifies a language content associated with one or more intents of the first natural language understanding machine learning model in the first human communication language. For example, the configured specification can include a configured set of user intents, entities, and vocabulary related to different user contexts. Language content associated with the intents such as user input statements or utterances in the primary language are also provided. In some embodiments, an identification of an association between the first natural language understanding machine learning model and a second natural language understanding machine learning model for a second human communication language is received. For example, an operator uses an NLU model builder tool to create a secondary NLU model based on a base configuration of a selected primary NLU model. As another example, an operator uses an NLU model builder tool to enable an additional language which in turn initiates the creation of a secondary NLU model for the additional language that is based on the primary model. In some embodiments, the first natural language understanding machine learning model and the second natural language understanding machine learning model are managed together including by detecting a change to the first natural language understanding machine learning model in the first human communication language and in response automatically assisting in maintaining consistency in the second natural language understanding machine learning model in the second human communication language with respect to the detected change. For example, a multilingual NLU model platform manages each primary model and its associated secondary models to identify any changes to a primary model such as a new topic, new utterances, and new vocabulary, among other changes. These changes are then migrated to the associated secondary models using an automated workflow. The multilingual NLU model platform allows the primary model to be the main source of development without sacrificing its consistency with respect to its associated secondary models. The secondary models are kept consistent with the primary model via the automated workflow for integrating updates.

FIG. 1 is a block diagram illustrating an example of a network environment for a multilingual Natural Language Understanding (NLU) model platform. In the example shown, clients 101, 103, and 105 access services of application server 121 via network 111 including services for managing and utilizing multilingual applications. The multilingual services can include virtual agent or conversation bot services as well as artificial intelligence search services, among others. Network 111 can be a public or private network. In some embodiments, network 111 is a public network such as the Internet. In some embodiments, application server 121 provides services for generating and configuring multilingual NLU-based applications including an NLU model builder tool. For example, an operator can utilize a multilingual NLU model builder tool to designate a primary NLU model for a primary language (such as English) and add support for additional languages (such as French, German, Chinese, Korean, etc.) by enabling secondary NLU models. The secondary NLU models are created based on the primary NLU model and are linked with the primary NLU model to maintain consistency between models. In various embodiments, application server 121 also provides functionality for training the NLU machine learning models once a model configuration has been approved, for example, by an assigned reviewer.

In some embodiments, clients 101, 103, and 105 are example client systems used to connect to cloud services offered by application server 121. Clients 101, 103, and 105 may have different software/hardware configurations and can include laptops, desktop computers, mobile devices, tablets, kiosks, smart televisions, or other appropriate computing devices. In some embodiments, the clients are used to configure an application, such as a multilingual NLU-based application. The application can be automatically generated and deployed to clients, such as clients 101, 103, and 105. When the multilingual NLU-based application is accessed by clients, the corresponding generated application or a web-based service accessible through a web browser can access application server 121 to access cloud-hosted application functionality that utilizes data from database 123. For example, a user can interact with a multilingual virtual agent in the user's preferred language to submit support tickets for information technology assets tracked in a database 123.

In some embodiments, the multilingual NLU model platform of FIG. 1 is used to configure, train, and review NLU machine learning models. For example, an NLU operator can access an NLU model building tool of application server 121 from any one of clients 101, 103, or 105. Using one of clients 101, 103, or 105, an NLU operator can configure an NLU model for a primary human communication language and link the primary model to one or more secondary NLU models for additional human communication languages. Each model can be assigned one or more reviewers, for example, that are experts in the respective human communication languages of the different models. When updates or changes are made to the primary model, the updates are migrated for integration into the associated secondary models. In response to updates to NLU models, the different assigned reviewers can be notified of the updates and access the changes from any one of clients 101, 103, or 105. In some embodiments, a reviewer approves the updates, and upon approval the corresponding NLU model is trained and published for use by a multilingual software application. In various embodiments, the review workflow and associated services are hosted at least in part by application server 121. In some embodiments, localization services including automated language translation services are also hosted at least in part by application server 121.

In various embodiments, application server 121 utilizes database 123 to provide certain services. For example, database 123 can be a configuration management database (CMDB) used by application server 121 for providing CMDB services including multilingual CMDB-based services. In some embodiments, database 123 is utilized by application server 121 to store information relevant to clients 101, 103, and 105, such as customer data as well as customer specific data for NLU-based services including NLU models. For example, database 123 can be used to store resource discovery information as part of a CMDB service for managing client resources. Although database 123 is shown connected to application server 121, database 123 may be located in a variety of network locations as appropriate. For example, database 123 may be located external to a local network that includes clients 101, 103, and 105. In some embodiments, database 123 is not directly connected to application server 121 but only communicatively connected to application server 121. In some embodiments, database 123 is a cloud-based database server and may be part of and/or collocated with application server 121. In some embodiments, database 123 is a persistent computer storage that is network accessible and used to reference entities identified in user input statements or utterances collected via a virtual agent.

Although single instances of some components have been shown to simplify the diagram of FIG. 1, additional instances of any of the components shown in FIG. 1 may also exist. For example, application server 121 may include one or more different servers and/or multiple distributed components. Similarly, database 123 may include one or more database servers and may not be directly connected to application server 121. For example, database 123 and its components may be replicated and/or distributed across multiple servers, components, and/or locations. In some embodiments, the server(s) for configuring and managing an NLU model are different from the servers for translating language content, training the NLU models, and/or for hosting multilingual NLU-based application services. As another example, clients 101, 103, and 105 are just a few examples of potential clients to application server 121. Fewer or more clients can connect to application server 121. In some embodiments, components not shown in FIG. 1 may also exist.

Figure 2:
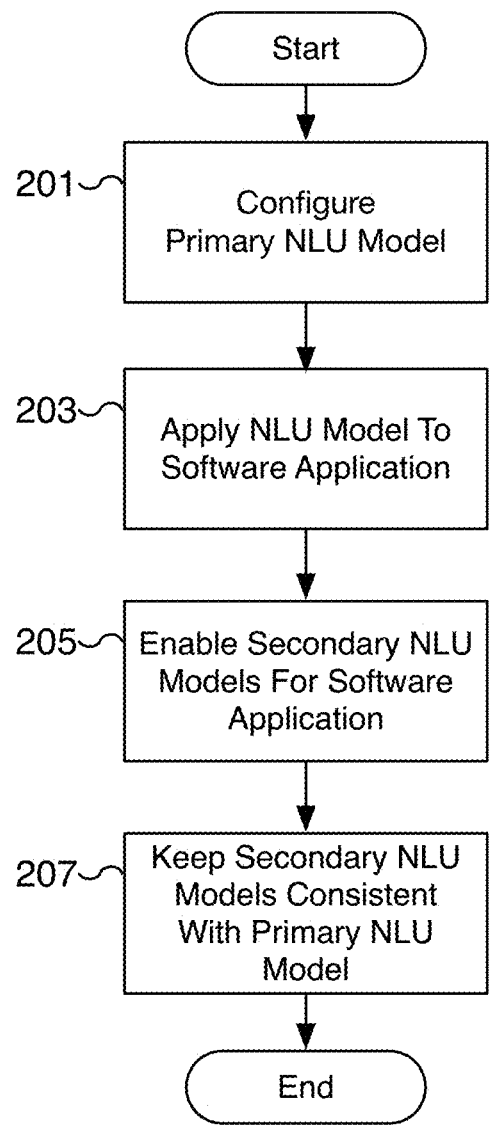
FIG. 2 is a flow chart illustrating an embodiment of a process for configuring related Natural Language Understanding (NLU) models using a multilingual NLU model platform.

FIG. 2 is a flow chart illustrating an embodiment of a process for configuring related Natural Language Understanding (NLU) models using a multilingual NLU model platform. Using the process of FIG. 2, a primary NLU model is configured and used to create secondary NLU models. Each NLU model is configured and trained to support a different human communication language. The NLU models can be integrated into software applications, such as a virtual agent service, to support multilingual functionality. As updates are made, the changes are automatically identified, and an automated workflow is provided to integrate the updates into the associated models. In some embodiments, the functionality of FIG. 2 is accessible via a graphical user interface application such as an NLU model builder tool. In some embodiments, the process of FIG. 2 is performed via a cloud service such as a cloud service running on application server 121 of FIG. 1. For example, the process of FIG. 2 can be performed via clients such as clients 101, 103, and 105 of FIG. 1 by accessing a cloud-based service hosted by application server 121 of FIG. 1. In some embodiments, the relevant data of the service and configured NLU models is stored in a database such as database 123 of FIG. 1.

At 201, a primary NLU model is configured. In various embodiments, as part of the primary NLU model configuration, a model name, description, and language are provided. For example, the primary human communication language can be configured to be English or another language. Additional properties of the primary NLU model are configured to help train the model to understand the context of user input statements. In some embodiments, the context of the primary NLU model is configured by defining properties of the model such as user intents (or topics), entities, and vocabulary, among other properties. For example, a "Reset Password" intent can be configured for resetting a user's password. User input statements (or user utterances) can be configured to be associated with the "Reset Password" intent. Example user input statements for a "Reset Password" intent include the phrases: "please reset my password asap!", "I forgot my password," "my password isn't working anymore," and "how do I change my credentials?", among others. These utterances are used to train the NLU model for the English language. As another example, the input statements "What is the status of my tickets," "Is my issue fixed yet," and "What is the status of my request" can be configured to be associated with a "Check IT Ticket Status" intent. Additionally, the specific words "tickets," "issue," and "request" from the corresponding input statements can be configured with a "Ticket number" entity. In various embodiments, a configured entity can correspond to and be associated with a field in a database such as a configuration management database (CMDB). By associating the user context with database tables and fields, the user context can be used to modify and/or rely on values from a corresponding identified database record. Other types of intents and entities can be configured as appropriate. For example, different types of entities can be configured including simple entities, mapped entities, pattern entities, system-derived entities, open-ended entities, and common entities, among others.

At 203, the primary NLU model is applied to a software application. For example, the primary NLU model is integrated for use by a software application to understand the context of user input statements. The enabled software application can include cloud-hosted software application services, mobile applications, client/server networked applications, and/or web-based software applications, among others. For example, a primary NLU model for understanding statements in English can be integrated with a virtual agent application. This allows the virtual agent application to interpret the user context of user input statements provided in English. For example, when a user inputs the statement "I need to change my password," the primary NLU model predicts that the intent is a "Reset Password" intent. The virtual agent application can utilize the inferred intent to respond to and resolve the user's request. In various embodiments, the NLU model is trained using a machine learning training platform at 201 and/or at 203 as part of the process of configuring and/or applying the NLU model to a software application. At 203, the software application supports a single human communication language by integrating the primary NLU model. Additional language support is added by enabling secondary NLU models at 205.

At 205, one or more secondary NLU models are enabled for the software application. For example, additional NLU models are integrated with the software application of 203 to enable support for understanding additional human communication languages (such as French, German, Chinese, and Spanish). For each additionally supported language, one additional secondary NLU model is enabled. In various embodiments, additional languages can be enabled via an NLU builder tool by specifying a new language to enable. In response to an indication to enable a new (secondary) language, a secondary NLU model is initialized using the primary NLU model. In some embodiments, the initialized secondary NLU model includes the configuration parameters of the primary model, such as the configured intents, entities, and vocabulary, among other parameters. Once initialized, the language content of the primary model can be automatically translated from the primary language to the specified language of the secondary model. The newly configured and initialized model can be reviewed for accuracy by a human reviewer before the model is trained. Once approved, the secondary model is trained using a machine learning training platform and the trained model is integrated into the software application. In some embodiments, the different supported languages of the software application are presented as different versions of the application instead of as a unified version that supports all languages although alternative approaches are appropriate as well. In some embodiments, the review process is optional and secondary models are automatically created, trained, and integrated into the software application to enable support for the additional language.

At 207, enabled secondary NLU models are kept consistent with the primary NLU model. For example, updates and/or changes to the primary NLU model are detected and identified for integration with respect to the secondary NLU models. In some embodiments, the updates to the primary model are automatically identified and queued for integration for each secondary model. As an example, additional intents can be added to a primary model to support additional functionality. The new intent is configured with user input statements, entities, and/or additional vocabulary. These new changes are automatically migrated to the secondary models, for example, by replicating the newly created intent framework. As part of the workflow process, language content for the new intent is automatically translated. For example, a new "Show Account Status" intent is added that responds to the user input statement "What is my account status?" The new intent is added to each secondary NLU model along with the appropriate translation of the user statement "What is my account status?" into each model's configured language. In some embodiments, the updates require a reviewer's approval before a model can be updated. For example, an assigned reviewer can be notified of the updates and is asked to provide feedback (such as changes to the language content translation for input statements and vocabulary) before the model is retrained. Once the changes to the secondary model are approved, the model can be trained and published to make the secondary model's functionality consistent with the primary model. In some embodiments, activating a trained model involves publishing the model to activate it for use by the software application.

In some embodiments, a reviewer may elect to not enable a specific intent for integration into a secondary model. For example, a specific intent may not be applicable in all languages. In the event an intent or other properties such as entities are not integrated into a secondary model, an NLU model builder tool can visually show what changes have not been enabled along with what changes have been enabled.

Figure 3:
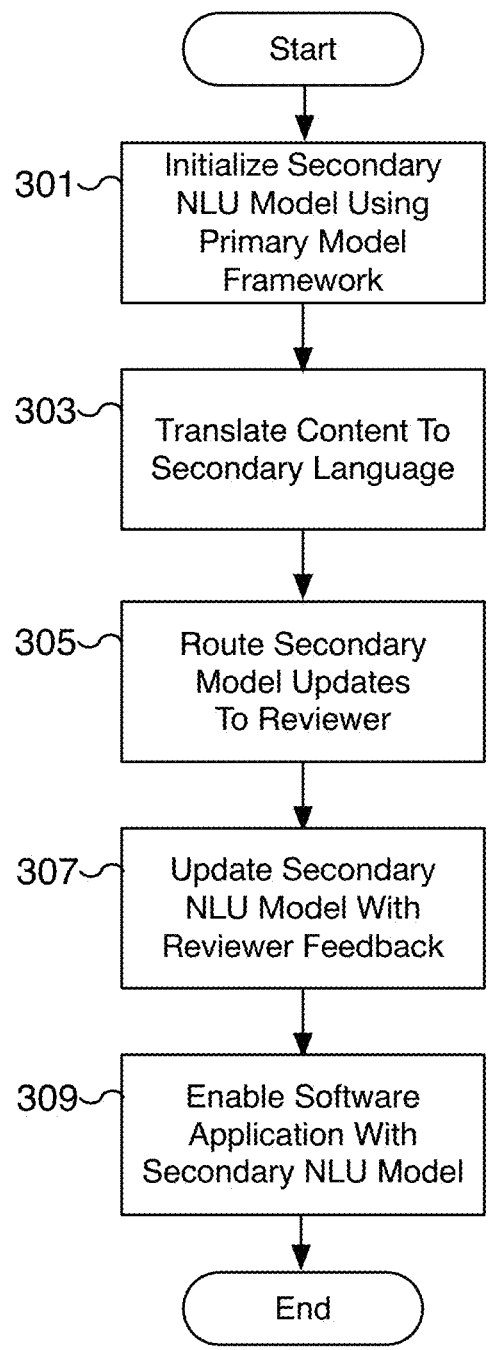
FIG. 3 is a flow chart illustrating an embodiment of a process for configuring a secondary Natural Language Understanding (NLU) model for a multilingual application using a multilingual NLU model platform.

FIG. 3 is a flow chart illustrating an embodiment of a process for configuring a secondary Natural Language Understanding (NLU) model for a multilingual application using a multilingual NLU model platform. Using the process of FIG. 3, a secondary NLU model is configured that is based on and linked to a primary NLU model. The two NLU models are each trained to infer the context of user input statements received in their different corresponding input languages. In some embodiments, the secondary model undergoes a review process where the model is first approved with reviewer feedback before the model is trained and integrated into a software application to enable support for the additional language. In some embodiments, the process of FIG. 3 is performed at 205 of FIG. 2. In some embodiments, the process of FIG. 3 is performed via a cloud service such as a cloud service running on application server 121 of FIG. 1. For example, an NLU model building tool can be accessed by clients such as clients 101, 103, and 105 of FIG. 1 as a service for enabling support for additional languages in an application via application server 121 of FIG. 1. In some embodiments, the relevant data of the service and the data associated with the configured secondary NLU model are stored in a database such as database 123 of FIG. 1.

At 301, a secondary NLU model is initialized using the framework of a primary NLU model. For example, the intents and corresponding entities configured for the primary model are included in the initial configuration for the secondary NLU model. Moreover, the configuration of the secondary NLU model is designed to accept language translations of corresponding language content including translations for user input statements and vocabulary from the primary NLU model. In various embodiments, by using the framework of the primary model for secondary models, any trained secondary model is easily integrated into software applications that support the primary model.

At 303, language content from the primary model is translated to a secondary language. For example, the user input statements (or user utterances) configured for the primary model are localized and translated into the language of the secondary NLU model. For example, each user statement in the language of the primary model is fed through a translation service to create a translated user statement in the language of the secondary model. In some embodiments, the translation is performed automatically using a translation service. In various embodiments, additional language content other than user statements is also translated. For example, in some embodiments, vocabulary configured for the primary model that can include synonyms as well as customized definitions and terms is translated as appropriate.

At 305, updates to the secondary model are routed to a reviewer. For example, a reviewer can be assigned to approve updates for the secondary NLU model. The updates that require approval can include the intents to install, the entities to configure with the intents, as well as confirmation that the language translations are appropriate. For example, in various scenarios, a reviewer may modify a translation or add/remove user input statements in the secondary language. In some embodiments, a reviewer may disable an intent from being included in a secondary model, for example, in the event the intent is not appropriate or applicable. In some embodiments, as part of the review workflow, the reviewer receives notifications of the updates that require review and approval, and the updates are made available for review via an NLU model builder tool.

At 307, the secondary NLU model is updated with reviewer feedback. For example, any feedback provided by the reviewer is applied to the secondary NLU model. In some embodiments, the additional feedback may include modified language translations, modifications to intents and/or entities, and modifications to the model vocabulary, among others. In some embodiments, updating the secondary model with reviewer feedback is optional and step 307 can be included to add a human review step to model creation.

At 309, a software application is enabled with the secondary NLU model. In various embodiments, the configuration of the secondary NLU model is complete and the model is now trained to create a secondary NLU machine learning model. Once trained, the model is integrated into a software application to enable the software application to infer user context from user input statements. In various embodiments, the software application can be a web-based application, a mobile device application, a cloud-hosted application service, or another multilingual NLU-based application. By integrating the secondary NLU model into the software application, the software application can now support an additional language other than the language of the primary NLU model. In some embodiments, the multilingual NLU-based application is created as a unified application that supports each of the languages of the primary and secondary NLU models. Alternatively, support for only a subset of languages, including support for only a single language, is built into different versions of the software application and users are directed to the appropriate version of the application based on the user's preferred language. In some embodiments, in the event multiple applications are created, the core software application remains the same as well as the interface between the application and the appropriate NLU model. By maintaining a consistent application to the NLU model interface, the software application can be configured to easily enable/disable support for different languages by switching NLU models.

Figure 4:
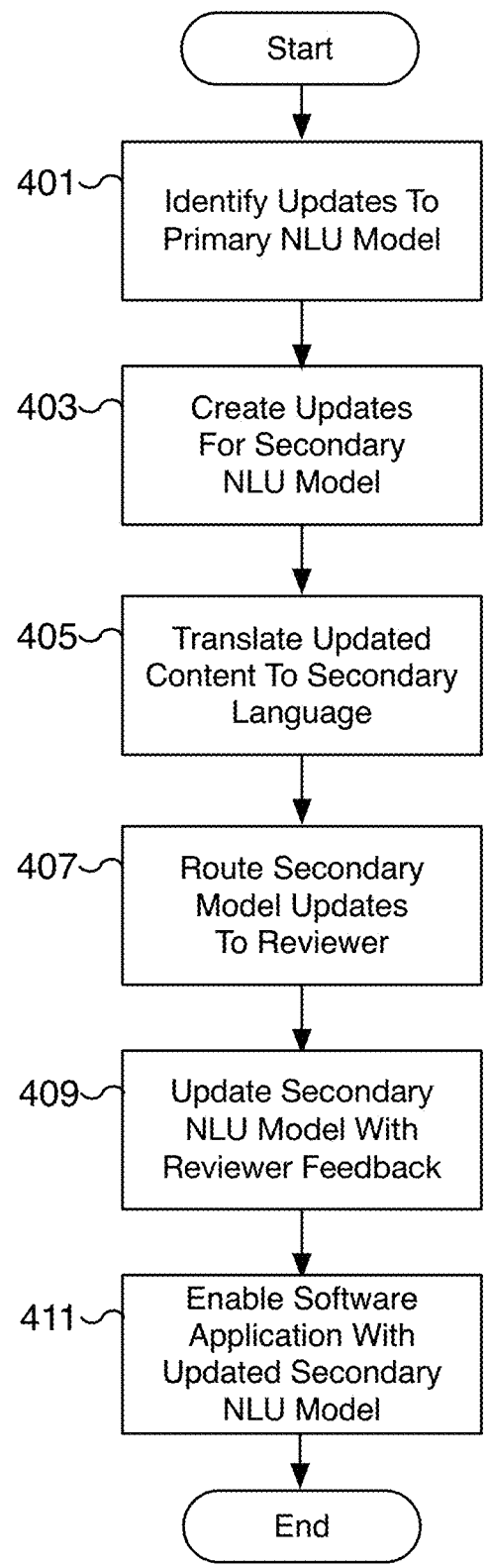
FIG. 4 is a flow chart illustrating an embodiment of a process for maintaining consistency between primary and secondary Natural Language Understanding (NLU) models by using a multilingual NLU model platform.

FIG. 4 is a flow chart illustrating an embodiment of a process for maintaining consistency between primary and secondary Natural Language Understanding (NLU) models by using a multilingual NLU model platform. Using the process of FIG. 4, the functionality of a secondary NLU model is kept consistent with the functionality of its related primary NLU model in response to changes to its primary model. Although described in the context of a single secondary model in relation to a primary model, the process of FIG. 4 can apply to all secondary models of a primary model so that all secondary models are kept consistent with the primary model. In some embodiments, the process of FIG. 4 is performed at 207 of FIG. 2. In some embodiments, the process of FIG. 4 is performed via a cloud service such as a cloud service running on application server 121 of FIG. 1. For example, an NLU model building tool for updating secondary NLU models can be accessed by clients, such as clients 101, 103, and 105 of FIG. 1, as a service via application server 121 of FIG. 1. In some embodiments, the relevant data of the service and the data associated with the primary and secondary NLU models are stored in a database such as database 123 of FIG. 1.

At 401, updates to a primary NLU model are identified. For example, changes to a primary model such as a new intent and corresponding user input statements and entities are detected and identified. In various embodiments, any configuration updates to a primary model are identified and considered for integration into associated secondary models to maintain the same functionality across all models.

At 403, updates are created for a secondary NLU model. For example, the changes identified at 401 are converted to potential updates for the secondary model. In some embodiments, the potential updates include the addition of new intents and their corresponding entities. In some embodiments, the potential updates can be new user input statements for an already existing intent. Other updates are possible as well and are created as pending potential updates for the secondary NLU model.

At 405, updated language content is translated to the language of the secondary NLU model. In various embodiments, language content associated with the updates created at 403 is localized and translated to a secondary language. In some embodiments, the translation is performed automatically using a translation service. Once translated, the potential updates created at 403 are updated with their corresponding updated translations. In some embodiments, an update for a new user statement includes both the translated user statement that will be used to train a new secondary NLU model as well as the new user statement in the primary language.

At 407, updates to the secondary model are routed to a reviewer. For example, a reviewer can be assigned to approve the potential updates to the secondary NLU model. In some embodiments, as part of the review workflow, the reviewer receives automatically generated notifications of the updates that require review and approval, and the updates are made available for review via an NLU model builder tool. Moreover, the assigned reviewer can be granted access permissions to modify the assigned updates, for example, to improve their accuracy. For example, for new user statements, an NLU model builder tool can display the new user input statement that requires approval by displaying the new input statement translated to the secondary model's language next to the original statement. Once shown together, a reviewer can provide feedback for the update by modifying the translation in the secondary language to match the original meaning of the new statement. In some embodiments, a reviewer may also reject new updates or portions of a new update. For example, a reviewer can reject a new intent or new user input statement from being included in a secondary model, for example, in the event the addition is not appropriate or applicable. In various embodiments, feedback and approval for an update to the secondary model can include different responses for different portions of the update. For example, an approval received from the assigned reviewer for an update can include an acceptance of a first portion of the update, a rejection of a second portion of the update, and a modification of a third portion of the update.

At 409, the secondary NLU model is updated with reviewer feedback. For example, any feedback provided by the reviewer at 409 is applied to the secondary NLU model. In some embodiments, the additional feedback may include modified language translations, modifications to intents and/ or entities, and modifications to the model vocabulary, among others. In some embodiments, updating the secondary model with reviewer feedback is optional and step 409 can be included to add a human review step to maintaining consistency between models.

At 411, a software application is enabled with the updated secondary NLU model. In various embodiments, the updates to the secondary NLU model are finalized and the model is now trained to create an updated secondary NLU machine learning model. Once trained, the new model is integrated into a software application and replaces the old model. By integrating the updated secondary NLU model into the software application, the software application can now support the same newly added functionality already offered by the software application in the primary language. In some embodiments, an NLU model designer publishes the newly trained model using an NLU model builder tool to activate support for the new model in the software application.

Figure 5:
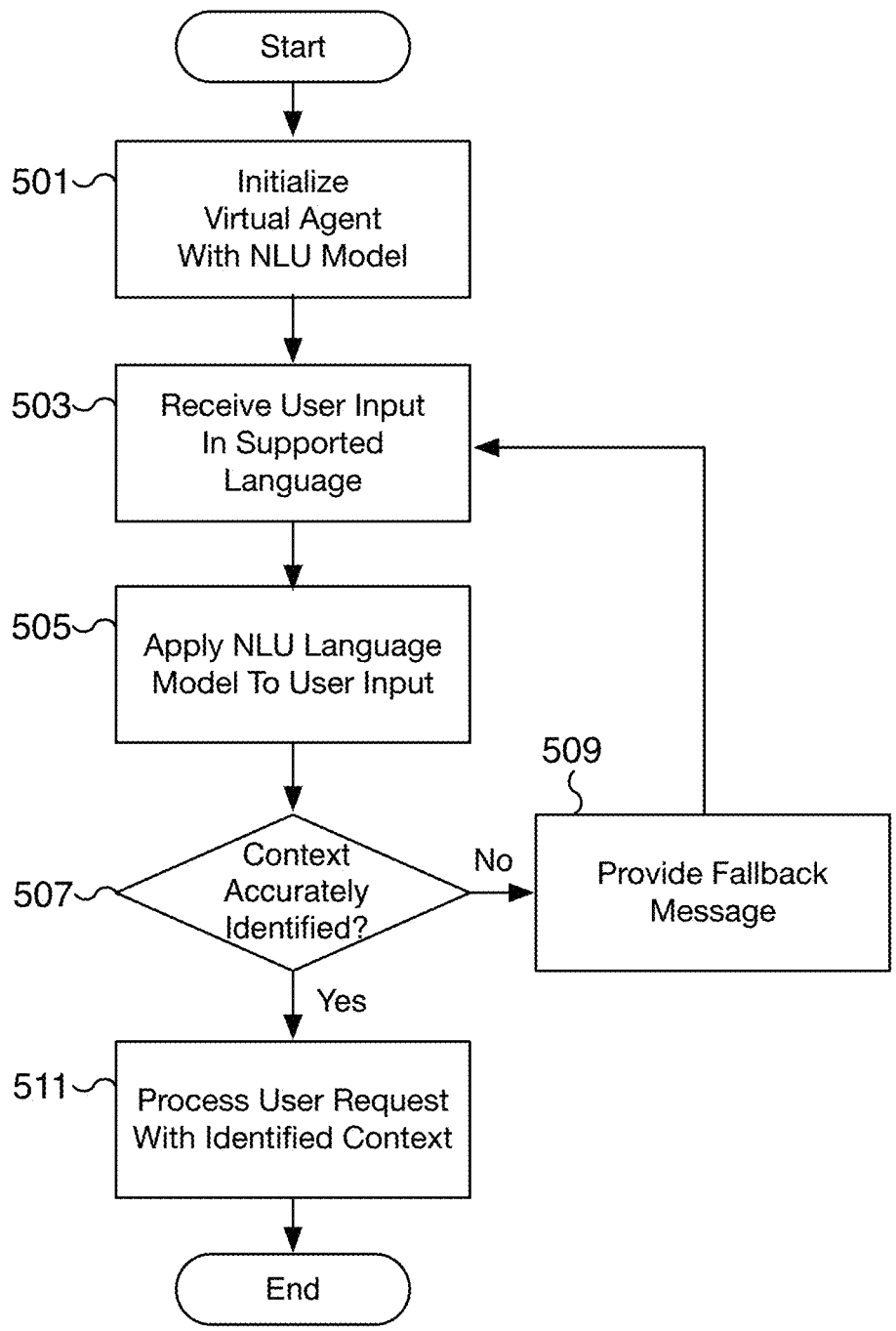
FIG. 5 is a flow chart illustrating an embodiment of a process of a multilingual virtual agent application for inferring user intent using a Natural Language Understanding (NLU) model.

FIG. 5 is a flow chart illustrating an embodiment of a process of a multilingual virtual agent application for inferring user intent using a Natural Language Understanding (NLU) model. For example, a multilingual application configured with one or more NLU models relies on the NLU models to infer user intent from user input statements for different languages. The multilingual virtual agent service and its configured NLU models are created and maintained using the processes of FIGS. 2-4. Although shown with respect to a virtual agent application, other applications such as an artificial intelligence search service, among others, can be integrated with NLU models to support inference of user context based on user input statements. In some embodiments, the process of FIG. 5 is performed by application server 121 of FIG. 1 as part of a virtual agent service accessible from clients such as clients 101, 103, and 105 of FIG. 1. In various embodiments, the virtual agent service supports multiple languages via different NLU models trained on different languages and the client accessing the virtual agent service has an identified preferred language. In some embodiments, the relevant data of the service and the data associated with the client and NLU models are stored in a database such as database 123 of FIG. 1.

At 501, a virtual agent software application is initialized with an NLU model. For example, a virtual agent software application is initialized that supports at least the preferred language of the user. In some embodiments, the virtual agent is a unified application that supports multiple languages by integrating multiple NLU models including a primary model and one or more secondary models. In some embodiments, multilingual support is implemented by creating multiple different versions of the same application, each supporting a different language via a different NLU model. For example, multiple applications are created that each integrate with a different single NLU model. A primary language application integrates with the primary NLU model and each application that supports a different language utilizes the same core application but integrates with a different secondary application. As updates are made to the primary model, secondary models are updated and corresponding applications are also updated.

At 503, user input is received in the application's supported language. For example, a user input statement is received in the language supported by the application. In some embodiments, the input language may correspond to the primary model or one of the secondary models. From the application perspective, the different models and corresponding languages are treated similarly since the software application interfaces with each NLU model using a consistent interface to infer user context from input statements regardless of the input language.

At 505, an NLU model is applied to the user input. For example, the configured NLU model for the language is utilized to predict the user's intent from the user's input statement received at 503. In some embodiments, a user context such as an intent and corresponding entities are inferred from the input statement by applying the NLU machine learning model. In some embodiments, depending on the user input, multiple intents may be predicted from the input and the different predicted intents are ranked by their corresponding prediction score. The highest scoring intent can be selected as the correct user context. In some embodiments, a threshold value is used to determine whether an intent is accurately predicted. For example, in the event no predicted intent has a prediction score that exceeds the required threshold, the NLU model is unable to accurately predict and identify the context of the user's input statement. In various embodiments, the result of step 505 is either an accurate or inaccurate prediction of user context. In the event the prediction is determined to be accurate, the result further includes the predicted user context such as a predicted intent and corresponding entities of the predicted intent.

At 507, a determination is made whether the user context is accurately identified. In the event no user context is accurately identified, processing proceeds to 509. For example, no user context is identified if no predicted intent has a prediction score that exceeds the required confidence threshold. In the event, a user context is accurately identified, processing proceeds to 511. For example, a user context is accurately identified in the event a predicted intent has a prediction score that exceeds the required confidence threshold and also has the highest prediction score among all other predicted intents.

At 509, a fallback message is provided. For example, a fallback message is provided and displayed to the user of the virtual agent that explains that the user's input statement was not understood. In various embodiments, the message may include suggestions on how to improve the user's input statement and/or one or more lower-confidence predictions of the user's context. For example, the virtual agent can respond with a display message that allows the user to select from multiple possible intents. In various embodiments, multiple possible intents may be provided when the prediction score of the predicted intents does not meet the required threshold to confidently determine a single user context. After the fallback message is provided at 509, processing returns to 503 to receive additional user input statements.

At 511, a user request is processed with the identified context. For example, the user's context is accurately predicted by applying the NLU model at 505 to determine a user's requests such as a request to reset the user's password, open a new incident ticket, check on the status of a reimbursement, etc. In various embodiments, at 511, the user's request can be processed by applying a topic or task workflow determined from the predicted intent and associated context. For example, the identified context can identify and map portions of the user input to fields in a database such as a configuration management database (CMDB).

In some embodiments, the workflow requires multiple steps and additional input statements may be required to complete the user's request. For example, a request to reset a user's password may require the user to provide an old password, provide additional secondary credentials, provide a new password, and finally confirm the password change. In various embodiments, additional input statements are received and processed by repeating the process of FIG. 5. For example, additional input statements are received by looping back to 503 while also preserving the current state of the user's request and the user context. In some embodiments, on repeated passes, the current state of the user's context is also used as an input to the NLU model.

Figure 6:
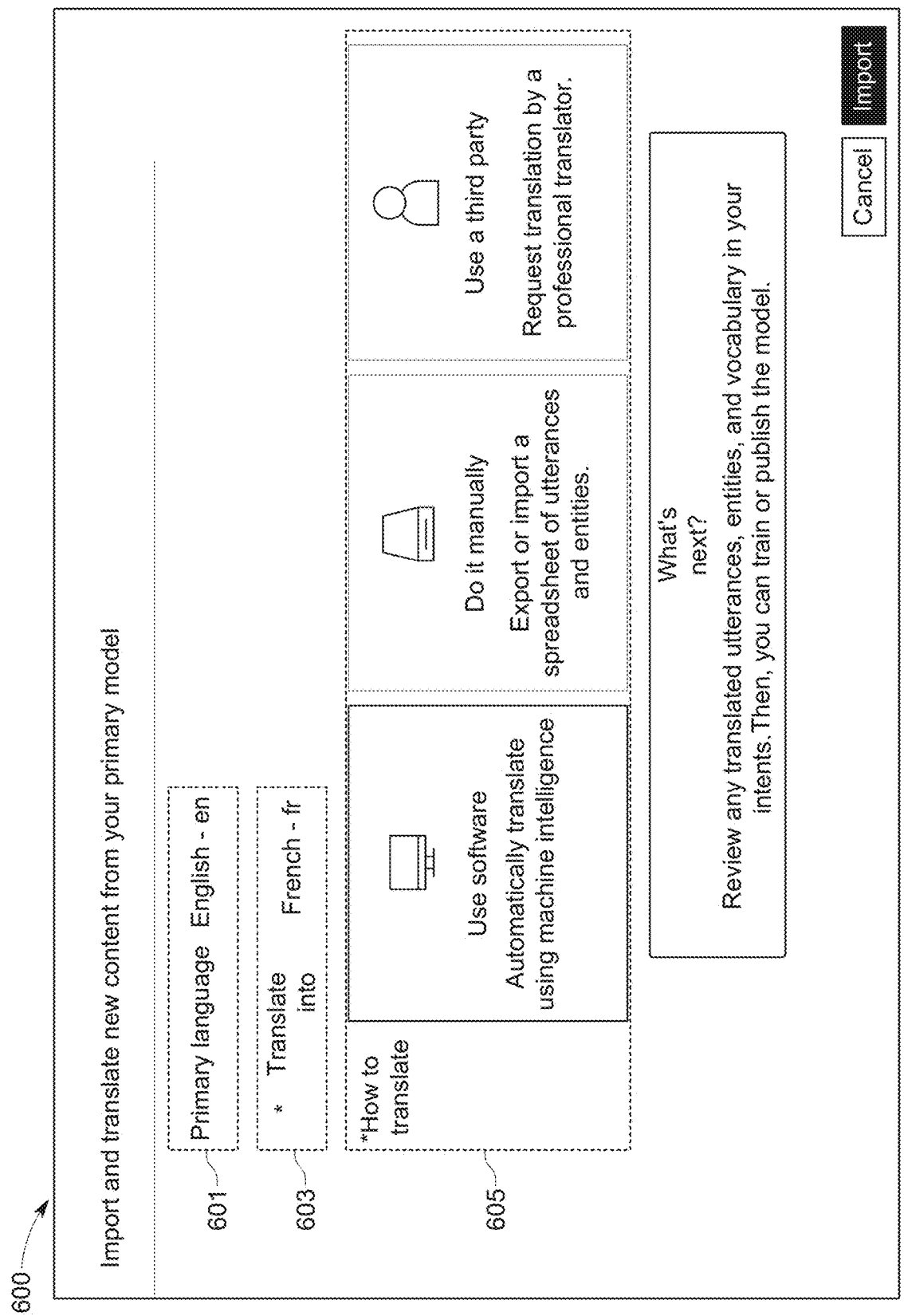
FIG. 6 is a diagram illustrating an embodiment of a user interface for updating a secondary Natural Language Understanding (NLU) model.

FIG. 6 is a diagram illustrating an embodiment of a user interface for updating a secondary Natural Language Understanding (NLU) model. In the example shown, user interface 600 is part of an NLU model building tool for updating a secondary NLU model with new content from a primary NLU model. In some embodiments, user interface 600 is displayed in response to the identification of changes to the primary NLU model. Key elements of user interface 600 include primary language field 601, secondary language field 603, and translation selection element 605. In some embodiments, the application of user interface 600 is hosted by a cloud service such as a cloud service running on application server 121 of FIG. 1 and is accessible by an NLU model designer from clients, such as clients 101, 103, and 105 of FIG. 1. In some embodiments, the relevant data of the service and the data associated with the primary and secondary NLU models are stored in a database such as database 123 of FIG. 1. In various embodiments, user interface 600 is presented to a reviewer at 205 of FIG. 2, at 303 and/or 307 of FIG. 3, and/or at 405 of FIG. 4 prior to translating language content for a secondary NLU model.

In the example shown, primary language field 601 displays the label "Primary language" and the value "English—en" to indicate that the primary language and the language of the primary NLU model is English. Secondary language field 603 displays the label "* Translate into" and the value "French—fr" to indicate that the language of this secondary NLU model is French. Translation selection element 605 allows the NLU model designer to select from multiple options for translation services including a software option, a manual option, and a third-party option. The current selected option is the software option (labeled as "use software") that automatically translates the language content using machine intelligence.

FIG. 7 is a diagram illustrating an embodiment of a user interface for reviewing potential updates to a secondary Natural Language Understanding (NLU) model. In the example shown, user interface 700 is part of an NLU model building tool for updating a secondary NLU model with new content from a primary NLU model. In some embodiments, user interface 700 is displayed in response to the identification of changes to the primary NLU model and after the relevant user content has been imported and translated via user interface 600 of FIG. 6. Key elements of user interface 700 include model header section 701, machine learning actions element 703, model configuration section element 705, and configured intents 711, 713, and 715. In some embodiments, the application of user interface 700 is hosted by a cloud service such as a cloud service running on application server 121 of FIG. 1 and is accessible by an NLU model designer from clients, such as clients 101, 103, and 105 of FIG. 1. In some embodiments, the relevant data of the service and the data associated with the primary and secondary NLU models are stored in a database such as database 123 of FIG. 1. In various embodiments, user interface 700 is presented to a reviewer at 205 of FIG. 2, at 305 of FIG. 3, and/or at 407 of FIG. 4 in response to potential updates to the secondary NLU model.

In the example shown, model header section 701 displays information of the secondary NLU model including the model name, language, and status. As shown, the model has an infrastructure icon (shown as a building icon), is named "ITSM," and is configured for the French language ("French—fr"). The model has the status "Needs review" since there are multiple configuration parameters of the model including configured intents 711, 713, and 715 that require a reviewer's approval. To the right of model header section 701 is machine learning actions element 703. Machine learning actions element 703 includes actions to train and to test the secondary NLU model. In various embodiments, machine learning actions element 703 invokes machine learning functionality using a machine learning service. In some embodiments, the functions of machine learning actions element 703 can only be activated once the items pending review have been resolved. Below model header section 701 is model configuration section element 705 of user interface 700. Model configuration section element 705 allows the NLU model designer to switch between displaying the model configuration for intents, entities, vocabulary, and model settings. In the example shown, the intents section is selected and displays three intents. Model configuration section element 705 also shows that there are 13 items for entities and 20 items for vocabulary.

In the example of user interface 700, since the intents section of model configuration section element 705 is selected, user interface 700 displays configured intents 711, 713, and 715. Each of configured intents 711, 713, and 715 displays the high-level status of a corresponding intent. For example, configured intents 711, 713, and 715 each require review ("Needs review"), are each mapped to a virtual agent software service, and are all enabled. Configured intent 711 has the name "Covid perks" and includes 5 utterances and 3 associated entities. In the example shown, utterances are user input statements that map to the associated intent. Configured intent 713 has the name "Hardware request" and includes 3 utterances and 3 associated entities. The last displayed intent, configured intent 715, has the name "Account access" and also includes 3 utterances and 3 associated entities. Each intent also displays timestamps corresponding to a creation date and last updated time.

FIG. 8 is a diagram illustrating an embodiment of a user interface for reviewing user input statements for updating a secondary Natural Language Understanding (NLU) model. In the example shown, user interface 800 is part of an NLU model building tool for updating a secondary NLU model with new content from a primary NLU model. In some embodiments, user interface 800 is an example of a user interface displayed in response to the identification of changes to the primary NLU model and after a reviewer has selected an intent with pending updates for review. In the example shown, user interface 800 is displayed in response to an NLU model designer selecting configured intent 711 of FIG. 7 for review. Key elements of user interface 800 include model configuration element 801, intent header section 803, and configured input statements 811, 813, 815, 817, and 819. In some embodiments, the application of user interface 800 is hosted by a cloud service such as a cloud service running on application server 121 of FIG. 1 and is accessible by an NLU model designer from clients, such as clients 101, 103, and 105 of FIG. 1. In some embodiments, the relevant data of the service and the data associated with the primary and secondary NLU models are stored in a database such as database 123 of FIG. 1. In various embodiments, user interface 800 is presented to a reviewer at 205 of FIG. 2, at 305 of FIG. 3, and/or at 407 of FIG. 4 in response to potential updates to the secondary NLU model.

In the example shown, model configuration element 801 shows the current configuration section selected for the NLU model. For example, model configuration element 801 shows that the NLU model designer is reviewing the "Covid perks" configuration portion of the "ITSM—French" model. Below model configuration element 801 is intent header section 803. Intent header section 803 displays information of the selected intent of the secondary NLU model and includes the intent name, language, and status. As shown, the selected intent has a page icon, is named "Covid perks," and is configured for the French language ("French—fr"). The selected intent has the status "Needs review" since there are multiple configured input statements including configured input statements 811, 813, 815, 817, and 819 that require a reviewer's approval. The bottom section of user interface 800 displays the configured input statements for the "Covid perks" intent under the expandable label "Show utterances." In the example shown, the user input statements configured for the "Covid perks" intent are displayed as user utterances and include configured input statements 811, 813, 815, 817, and 819. Each configured input statement includes both the translated statement in French above the original statement from the primary NLU model in English (the primary language). For example, configured input statement 811 displays the automatically translated statement "quels sont mes avantages covid" that corresponds to the English input statement "What are my covid perks" configured for the primary NLU model. Each of the configured input statements relates to the context of the "Covid perks" intent.

In various embodiments, an NLU model designer using user interface 800 can modify, delete, and/or add input statements to accurately reflect the appropriate input statements applicable to the context of the "Covid perks" intent. In some embodiments, all the proposed updates for a model must be reviewed and approved before the model can be trained and tested. For example, once the set of updates for the model is approved, the model configuration including the configured input statements is used to train the secondary NLU model to infer a user's context when input statements are provided in French.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a specification of a first natural language understanding machine learning model for a first human communication language, wherein the specification specifies a language content associated with one or more intents of the first natural language understanding machine learning model in the first human communication language, wherein the first natural language understanding machine learning model is configured to map a statement specified in the first human communication language to a corresponding intended task desired to be performed using a software;
   receiving an identification of an association between the first natural language understanding machine learning model and a second natural language understanding machine learning model for a second human communication language, wherein the second natural language understanding machine learning model and the first natural language understanding machine learning model each support understanding a different corresponding single human communication language for the software; and
   managing together the first natural language understanding machine learning model and the second natural language understanding machine learning model as separate models including by detecting a change affecting a software task understanding ability of the first natural language understanding machine learning model in the first human communication language and in response automatically assisting in maintaining consistency in a software task understanding ability of the second natural language understanding machine learning model in the second human communication language with respect to the detected change.

2. The method of claim 1, further comprising, in response to detecting the change to the first natural language understanding machine learning model, automatically generating a notification to an assigned reviewer of the second natural language understanding machine learning model.

3. The method of claim 2, further comprising creating an update to the second natural language understanding machine learning model, wherein the update is based on the detected change to the first natural language understanding machine learning model.

4. The method of claim 3, further comprising granting access permissions for the assigned reviewer to modify the update to the second natural language understanding machine learning model.

5. The method of claim 4, further comprising:
   receiving an approval from the assigned reviewer for the update to the second natural language understanding machine learning model;
   applying the approved update to the second natural language understanding machine learning model; and
   training the second natural language understanding machine learning model.

6. The method of claim 5, wherein the approval received from the assigned reviewer for the update to the second natural language understanding machine learning model includes an acceptance of a first portion of the update, a rejection of a second portion of the update, and a modification of a third portion of the update.

7. The method of claim 1, further comprising:
   integrating the second natural language understanding machine learning model with a software application to support the second human communication language, wherein the software application is already integrated to rely on the first natural language understanding machine learning model to support the first human communication language.

8. The method of claim 7, wherein the software application is a virtual agent service or an artificial intelligence search service.

9. The method of claim 1, wherein each of the one or more intents of the first natural language understanding machine learning model is associated with one or more entities, and wherein at least one of the one or more entities is mapped to a word or phrase of an input statement of the language content associated with the one or more intents of the first natural language understanding machine learning model in the first human communication language.

10. The method of claim 1, wherein each of the one or more intents of the first natural language understanding machine learning model is associated with one or more entities, and wherein at least one of the one or more entities is associated with a database record of a configuration management database (CMDB).

11. The method of claim 1, further comprising automatically translating the language content associated with the one or more intents of the first natural language understanding machine learning model in the first human communication language into the second human communication language.

12. A system, comprising:
one or more processors; and
a memory coupled to the one or more processors, wherein the memory is configured to provide the one or more processors with instructions which when executed cause the one or more processors to:
receive a specification of a first natural language understanding machine learning model for a first human communication language, wherein the specification specifies a language content associated with one or more intents of the first natural language understanding machine learning model in the first human communication language, wherein the first natural language understanding machine learning model is configured to map a statement specified in the first human communication language to a corresponding intended task desired to be performed using a software;
receive an identification of an association between the first natural language understanding machine learning model and a second natural language understanding machine learning model for a second human communication language, wherein the second natural language understanding machine learning model and the first natural language understanding machine learning model each support understanding a different corresponding single human communication language for the software; and
manage together the first natural language understanding machine learning model and the second natural language understanding machine learning model as separate models including by detecting a change affecting a software task understanding ability of the first natural language understanding machine learning model in the first human communication language and in response automatically assisting in maintaining consistency in a software task understanding ability of the second natural language understanding machine learning model in the second human communication language with respect to the detected change.

13. The system of claim 12, wherein the memory is further configured to provide the one or more processors with instructions which when executed cause the one or more processors to create an update to the second natural language understanding machine learning model, wherein the update is based on the detected change to the first natural language understanding machine learning model.

14. The system of claim 13, wherein the memory is further configured to provide the one or more processors with instructions which when executed cause the one or more processors to:
process a received approval from an assigned reviewer for the update to the second natural language understanding machine learning model;
apply the approved update to the second natural language understanding machine learning model; and
train the second natural language understanding machine learning model.

15. The system of claim 14, wherein the received approval from the assigned reviewer for the update to the second natural language understanding machine learning model includes an acceptance of a first portion of the update, a rejection of a second portion of the update, and a modification of a third portion of the update.

16. The system of claim 12, wherein the memory is further configured to provide the one or more processors with instructions which when executed cause the one or more processors to integrate the second natural language understanding machine learning model with a software application to support the second human communication language, wherein the software application is already integrated to rely on the first natural language understanding machine learning model to support the first human communication language.

17. The system of claim 16, wherein the software application is a virtual agent service or an artificial intelligence search service.

18. The system of claim 12, wherein each of the one or more intents of the first natural language understanding machine learning model is associated with one or more entities, and wherein at least one of the one or more entities is associated with a database record of a configuration management database (CMDB).

19. The system of claim 12, wherein each of the one or more intents of the first natural language understanding machine learning model is associated with one or more entities, and wherein at least one of the one or more entities is mapped to a word or phrase of an input statement of the language content associated with the one or more intents of the first natural language understanding machine learning model in the first human communication language.

20. A computer program product, the computer program product being embodied in a non-transitory computer readable storage medium and comprising computer instructions for:
receiving a specification of a first natural language understanding machine learning model for a first human communication language, wherein the specification specifies a language content associated with one or more intents of the first natural language understanding machine learning model in the first human communication language, wherein the first natural language understanding machine learning model is configured to map a statement specified in the first human communication language to a corresponding intended task desired to be performed using a software;
receiving an identification of an association between the first natural language understanding machine learning model and a second natural language understanding machine learning model for a second human communication language, wherein the second natural language understanding machine learning model and the first natural language understanding machine learning model each support understanding a different corresponding single human communication language for the software; and managing together the first natural language understanding machine learning model and the second natural language understanding machine learning model as separate models including by detecting a change affecting a software task understanding ability of the first natural language understanding machine learning model in the first human communication language and in response automatically assisting in maintaining consistency in a software task understanding ability of the second natural language understanding machine learning model in the second human communication language with respect to the detected change.

\* \* \* \* \*